(12) United States Patent
Tilton et al.

(10) Patent No.: US 7,226,879 B2
(45) Date of Patent: *Jun. 5, 2007

(54) MULTIDENSITY LINER/INSULATOR FORMED FROM MULTIDIMENSIONAL PIECES OF POLYMER FIBER BLANKET INSULATION

(75) Inventors: Jeffrey A. Tilton, Prospect, KY (US); Anthony L. Rockwell, Pickerington, OH (US)

(73) Assignee: Owens-Corning Fiberglas Technology Inc., Summit, IL (US)

( * ) Notice: Subject to any disclaimer, the term of this patent is extended or adjusted under 35 U.S.C. 154(b) by 179 days.

This patent is subject to a terminal disclaimer.

(21) Appl. No.: 10/749,084

(22) Filed: Dec. 30, 2003

(65) Prior Publication Data

US 2005/0148259 A1   Jul. 7, 2005

(51) Int. Cl.
*D04H 1/00* (2006.01)
*D04H 13/00* (2006.01)
*D04H 3/00* (2006.01)
*D04H 5/00* (2006.01)

(52) U.S. Cl. .............. 442/327; 442/357; 442/361; 442/394

(58) Field of Classification Search .............. 442/357, 442/361, 394, 327
See application file for complete search history.

(56) References Cited

U.S. PATENT DOCUMENTS

| 2,729,770 | A |  | 1/1956 | Robbins |
| 3,761,555 | A |  | 9/1973 | Wienand et al. |
| 4,756,957 | A | * | 7/1988 | Kielmeyer ................... 428/402 |
| 5,266,374 | A |  | 11/1993 | Ogata |
| 5,361,466 | A | * | 11/1994 | Robertson et al. ............. 28/158 |
| 5,456,872 | A | * | 10/1995 | Ahrweiler ................... 264/115 |
| 5,554,830 | A | * | 9/1996 | Muller et al. ............... 181/290 |
| 6,630,046 | B1 | * | 10/2003 | Plotz .......................... 158/148 |
| 2003/0003835 | A1 |  | 1/2003 | Tilton et al. |
| 2003/0066708 | A1 |  | 4/2003 | Allison et al. |
| 2003/0096079 | A1 |  | 5/2003 | Messina et al. |
| 2004/0023586 | A1 | * | 2/2004 | Tilton ......................... 442/381 |

FOREIGN PATENT DOCUMENTS

| DE | 3925354 |   | 2/1991 |
| DE | 4419886 |   | 12/1995 |
| GB | 2029461 A | * | 3/1980 |
| JP | 58145435 |   | 8/1983 |
| JP | S58-145435 | * | 8/1983 |
| JP | 4074750 |   | 3/1992 |
| JP | 5050874 |   | 3/1993 |
| JP | 8127008 |   | 5/1996 |

* cited by examiner

*Primary Examiner*—Norca L. Torres
(74) *Attorney, Agent, or Firm*—Inger H. Eckert; Margaret S. Millikin

(57) ABSTRACT

In accordance with the purposes of the present invention as described herein, an improved acoustical, compressible, polymer fiber blanket of enhanced performance characteristics is provided. The polymer fiber blanket of the present invention is constructed of a plurality of individual pieces of polymer fiber blanket that have been bonded together via heat and pressure.

30 Claims, 6 Drawing Sheets

| Product | Dry Recovery | Dry Compression | Wet Recovery | Wet Compression |
|---|---|---|---|---|
| 68 gsf Uniform Blanket | 97.5 | 24.1 | 80.4 | 22.3 |
| 1" cube 60 gsf | 96.5 | 16.3 | 87.4 | 17.9 |
| 1" cube 45 gsf | 96.5 | 21.3 | 87.4 | 17.9 |

MULTIDENSITY LINER/INSULATOR FORMED FROM MULTIDIMENSIONAL PIECES OF POLYMER FIBER BLANKET INSULATION

RELATED PATENT APPLICATIONS

This patent application is related to copending U.S. patent application Ser. No. 10/160,776; filed May 31, 2002 and copending U.S. patent application Ser. No. 09/607,478 filed Jun. 30, 2000, the full disclosures of both applications are incorporated herein by reference in their entirety.

TECHNICAL FIELD AND INDUSTRIAL APPLICABILITY OF THE INVENTION

The present invention relates generally to a multilayer acoustical and thermal liner/insulator formed from multidimensional pieces of a polymeric material, which may be utilized to insulate an environment such as a passenger compartment of a vehicle from the heat and sound generated by mechanical components of that vehicle during its operation. The material is especially useful in automotive undercarpet products or in applications where compression recovery is an important property. Other uses include application in insulating appliances such as dishwashers and clothes dryers and providing sound and thermal insulation for furnaces, air conditioning units and ductwork in buildings including homes, offices and industrial structures.

BACKGROUND OF THE INVENTION

Acoustical insulation is well known in the art. Acoustical insulation typically relies upon both sound absorption, i.e. the ability to absorb incident sound waves, and transmission loss, i.e. the ability to reflect incident sound waves, in order to provide sound attenuation. One of the more prevalent uses of such insulation is in the motorized vehicle field where engine compartments, fire walls, fender wells, doors, floor pans and other components of the passenger compartment shell are commonly acoustically insulated to reduce engine and road noise for the benefit and comfort of passengers.

In the automotive undercarpet industry, it is important to prevent compression of the carpet surrounding the area on which a load, i.e., a passenger's feet, is placed. By preventing compression, acoustical and insulative properties to be maintained. Various methods of manufacturing or fabricating acoustical and thermal insulators are known in the art. Typically, an automotive carpet is placed over a cotton shoddy or a uniform polymer based mat. These undercarpets are typically produced by carding, garnetting or air laid systems known in the art. Examples of other methods and products are found in U.S. Pat. No. 5,266,374, and U.S. publication Nos. 2003/0066708 A1 and 2003/0096079.

U.S. Pat. No. 5,266,374 teaches a carpet for vehicles that prevents the transmission of sound and vibration into a vehicle cabin. '374 teaches a rigid polyurethane sheet laid on a metal panel, such as that of a vehicle floor. The polyurethane sheet comprises an elastomeric rubber layer, which further comprises a plurality of incompressible, square blocks which are intermittently disposed between the rigid and elastomeric layers. The rigid blocks are arranged so as to not come into contact with one another.

U.S. Pub. No. 2003/0096079 A1 teach a sound attenuating laminate for use in vehicles including a substrate having opposite first and second surfaces formed of foam, massback, thermoformable fibrous material. A first surface is attached to a vehicle panel. A non-porous polyurethane layer is applied to either portions of or the entire substrate second surface. The laminate is formed by forming the substrate in the shape of the article to which it is to be applied and then spraying the polyurethane layer onto the substrate.

U.S. Pub. No. 2003/0066708 A1 teach a sound attenuating composite article for vehicles having several layers of material. The first layer is either fiber batting or acoustic foam, the second layer is a thermoplastic material fused to the surface of the first layer, the third layer is a thermoplastic material fused to the surface of the second layer, and the forth layer is a woven or nonwoven mixture of fibers attached to the third layer of material. The article is formed by providing the first layer and then extruding a second layer of thermoplastic material onto the first layer, compressing the first and second layers and then extruding a third layer of thermoplastic material onto the second layer. Scrim material is then attached to the third layer of thermoplastic material and then all four layers are compressed via nip rolls. Finally, the article is place in a heated mold and heated via infrared radiation.

In many acoustical insulation applications and particularly those relating to motorized vehicles, high compressive strength is advantageous, especially in vehicle carpet applications so that the acoustical properties are maintained. As demonstrated by these prior art patents, it has generally been found necessary to coat a uniform substrate with one or more layers of thermoplastic material. A need is therefore identified for an improved insulation providing enhanced acoustical properties while also exhibiting compression-recovery. There is also a need for a product that can be manufactured at a lower cost and reduces waste.

SUMMARY OF THE INVENTION

In accordance with the purposes of the present invention as described herein, an improved acoustical, compressible, polymer fiber blanket of enhanced performance characteristics is provided. The polymer fiber blanket of the present invention is constructed of a plurality of individual pieces of polymer fiber blanket that have been bonded together via heat and pressure. The blanket is manufactured by cutting pieces of polymer fiber blanket from a uniform sheet of material that can be either pre-consumer or post-consumer material. The pre-cut, uniform sheet is made of staple fibers, i.e., glass fibers and bicomponent thermoplastic fibers such as polyester with copolyester bicomponent fibers. Other polymers that may be used as thermoplastic fibers include polypropylene, polyethylene and nylon. After pieces of the uniform sheet are cut, they are laid down in a randomly oriented pattern. The individual pieces of polymer fiber blanket are then bonded by heat and pressure to form a polymer fiber blanket having enhanced compressive qualities. In the formation of the blanket, the individual pieces build thickness easily and allow lower density products to be produced for a given thickness without sacrificing compressive recovery properties.

The individual pieces of the polymer fiber blanket are cut from a uniform sheet which includes a pad of fibrous material having a lofty, acoustically insulating portion. The individual pieces may be cut from a pre-made sheet of fibrous material or may be cut from scrap material. The polymer fiber blanket also includes a relatively higher density skin along at least one face thereof.

The pad is a nonlaminate and, accordingly, the potential for the relatively higher density skin to delaminate from the remainder of the pad is eliminated. In one embodiment of the invention, the pad includes a higher density skin along a second face thereof as well.

In another embodiment of the present invention, the polymer fiber blanket may be bonded to at least one uniform layer of flexible, polymeric fibrous material, such as the uniform sheet from which individual pieces of polymer fiber blanket are cut from, as described above.

Still other objects of the present invention will become apparent to those skilled in this art from the following description wherein there is shown and described preferred embodiments of this invention, simply by way of illustration of several of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention and together with the description serves to explain the principles of the invention. In the drawings.

Reference will now be made in detail to the present preferred embodiments of the invention, examples of which are illustrated in the accompanying drawing.

DETAILED DESCRIPTION AND PREFERRED EMBODIMENTS OF THE INVENTION

Figure 1:
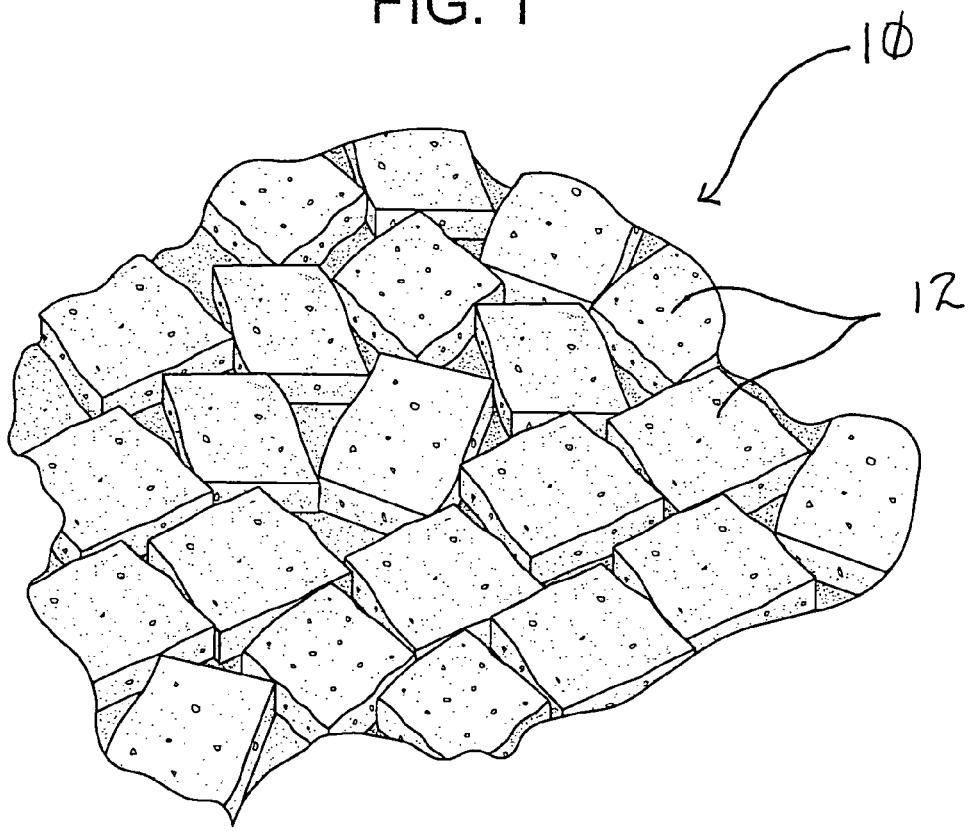
FIG. 1 is a perspective view of the polymer fiber blanket of the present invention.
Figure 4:
FIG. 4 is an end elevational view of the embodiment of the present invention as depicted in FIG. 1.

Reference is now made to FIG. 1, which illustrates a first embodiment of the compressible, flexible polymer fiber blanket designated by reference numeral 10. The polymer fiber blanket 10 is constructed of a plurality of individual pieces of polymer fiber blanket 12 that have been bonded together by applying heat and pressure. FIG. 4 is an end elevational view of the product 10 as disclosed in FIG. 1 showing the bonded individual pieces 32.

The individual pieces 12 are produced from a thermally bonded polymer blanket product that is typically made of a combination of staple fibers and bicomponent fibers. The fibrous material may take the form of (a) thermoplastic polymer staple fibers and thermoplastic bicomponent fibers, (b) glass staple fibers and thermoplastic bicomponent fibers and (c) a combination of (a) and (b). The thermoplastic staple fibers and bicomponent fibers may be selected from a group of materials including but not limited to polyester, polyethylene, polypropylene, nylon and any mixtures thereof. The glass fibers may include E-glass, S-glass or basalt fibers. Natural fibers (e.g. hemp, kenaf) may also be included.

Figure 5:
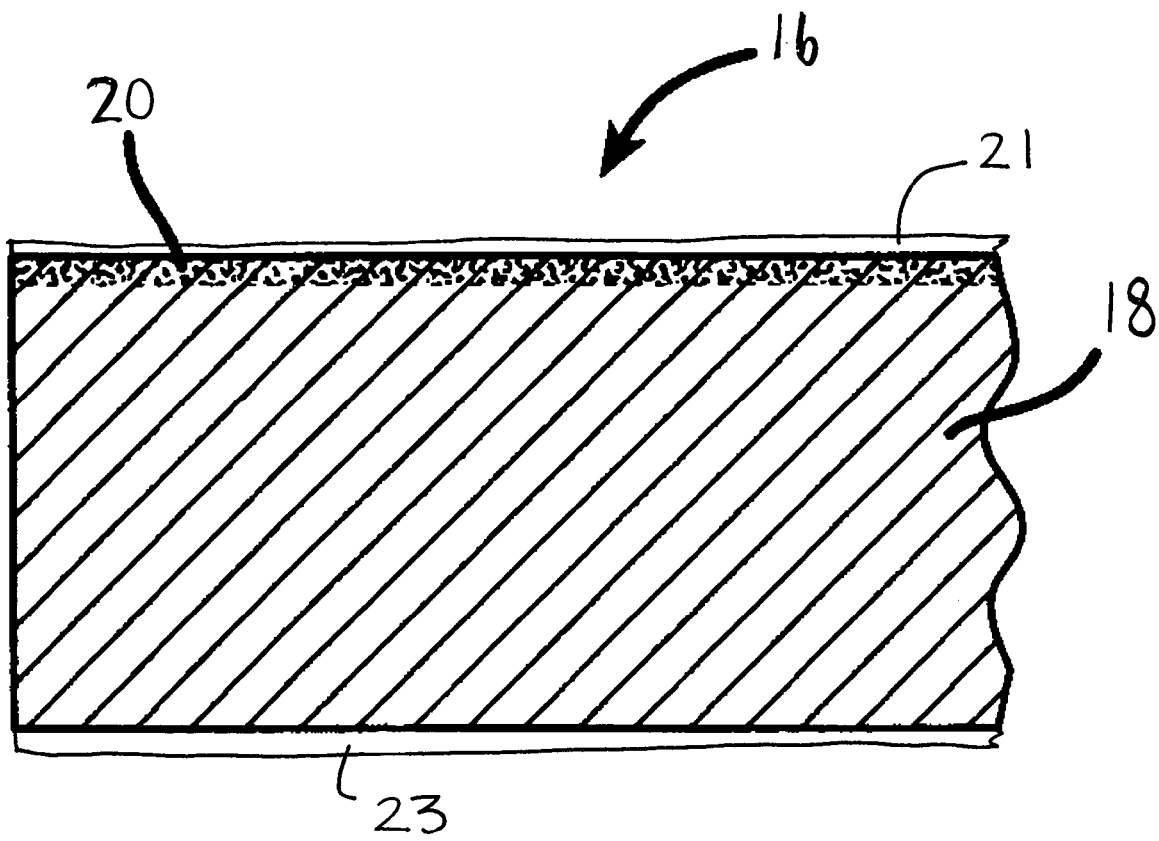
FIG. 5 is an end elevation view of uniform blanket used to make the present invention as depicted in FIGS. 1–4.

FIG. 5 depicts a uniform, polymer blanket 16 from which the individual pieces 12 (FIG. 1) are cut. The uniform blanket 16 includes a lofty, acoustically insulating portion 18 having a density of between substantially 8.0–80.0 kg/m$^3$ and a relatively higher density skin 20 along one face thereof. The skin 16 has a thickness of between substantially 0.25–10.0 mm and a density of between substantially 32.0–800.0 kg/m$^3$. The density of the skin 20 may be substantially constant throughout its thickness or it may vary gradually lower from a maximum density along the outer face thereof to a density just above that of the insulating portion 18 along the inner portion thereof. Where the density of the skin 20 varies, the average density for the skin falls within the indicated range.

The uniform blanket 16 may not contain the skin 20 or, in the alternative, may contain a first skin 20 and a secondary skin (not shown). Further, the blanket may include a facing, on one or both sides, to improve strength and/or surface appearance. Other embodiments and details of the material that may be used with the present invention are discussed in U.S. patent application Ser. No. 10/160,776; filed May 31, 2002, which is incorporated herein by reference in its entirety.

Figure 8:
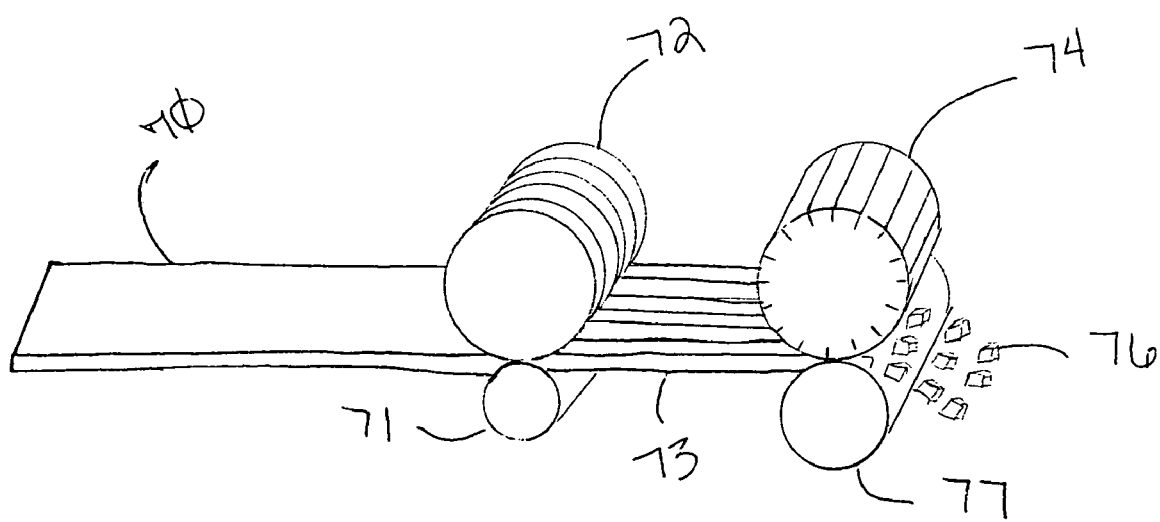
FIG. 8 is an perspective view of a cutting device used in accordance with the present invention.

The blanket 10 is made by cutting pieces of polymer fiber blanket from a uniform sheet of material that can be either pre-consumer or post-consumer, i.e., scrap material. A pre-cut, uniform sheet is made of staple fibers, i.e., glass fibers and bicomponent thermoplastic fibers, as described above. The uniform sheet is cut into a plurality of individual pieces, preferably geometric shapes, i.e., cubes. The uniform sheet may be cut by any means known in the art. A preferable way of cutting the uniform sheet is shown in FIG. 8. FIG. 8 shows uniform sheet 70 being drawn in between splitter unit 72, having multiple blades, and guide roller 71. Splitter unit 72 divides the sheet 70 into strips of material 73. The strips of material 73 are then fed in between cutting roller 74, having multiple blades, and guide roller 77 where the strips of material 73 are cut into individual pieces 76 by cutting roller 74. After the cutting process, the individual pieces of blanket are then laid down onto a forming chain and then bonded by heat and pressure.

As the pieces of blanket are compressed, they become randomly oriented as depicted in FIG. 1. While being subjected to heat and pressure, the bicomponent fibers from which the pieces of blanket are made as described above, are activated causing the fibers in the individual pieces to bond together forming a uniform blanket.

Figure 7:
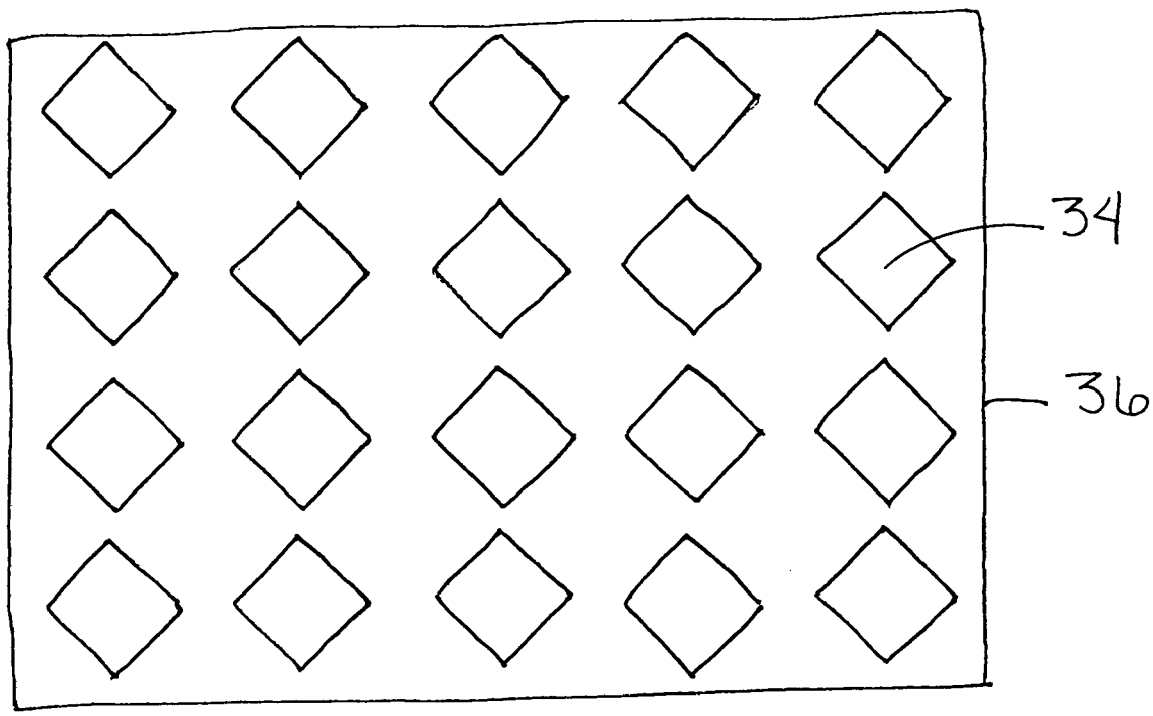
FIG. 7 is a plan view of a preferred embodiment of the present invention.

As a result of the random orientation of the pieces 12 in the blanket 10, as shown in FIG. 1, the blanket 10 exhibits increased compressive resistance over a uniform blanket. As such, the blanket 10 is suitable for use in automotive undercarpet products or other applications where compressive resistance is important such as cushioning for seating. To better control compression of the polymer blanket, the individual pieces 12 may be arranged in a controlled pattern instead of a random orientation. Any pattern may be implemented; FIG. 7 shows a sample of such a pattern, showing individual pieces 34 are arranged in a controlled pattern on uniform blanket 36.

Figure 6:
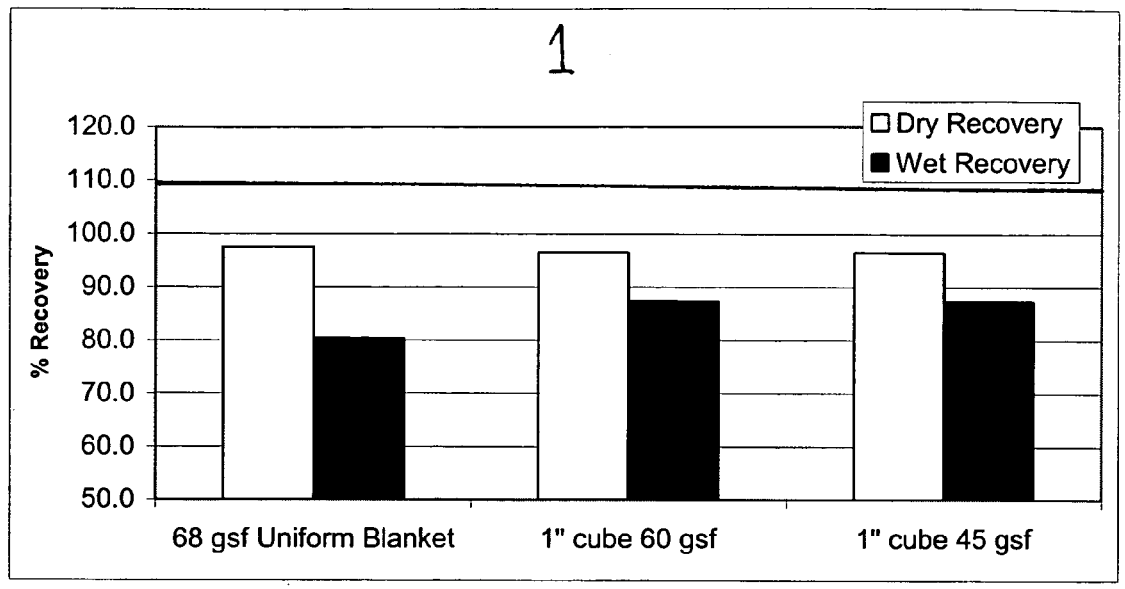
FIG. 6 shows two graphs of compression and recoverability data of the present invention.
Figure 6:
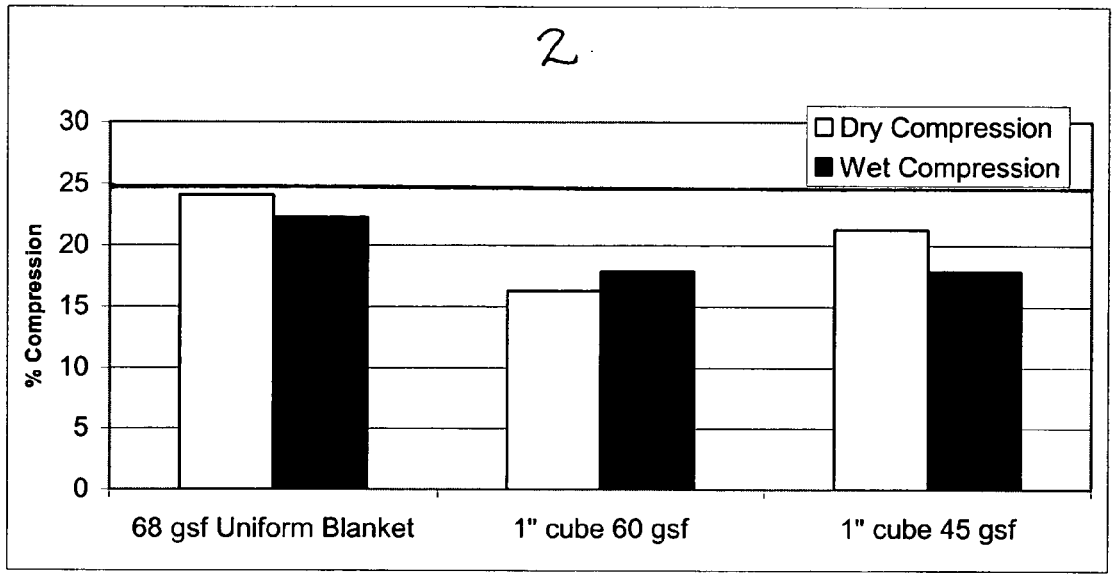

FIG. 6 shows compression and recovery data of the present invention as compared to a uniform blanket. Graph 1 shows percent recovery (wet and dry) of a 68 gsf uniform blanket compared to a 1" 60 gsf cube and a 1" 45 gsf cube of the present invention. Graph 2 shows percent compression (wet and dry) of a 68 gsf uniform blanket compared to a 1" 60 gsf cube and a 1" 45 gsf cube of the present invention. The test method used is SAE J1352 "Compression and Recovery Method BC". As shown in FIG. 6, the cubed product of the present invention provides improved wet recovery and improved wet and dry compression over the uniform blanket.

Although FIG. 1 depicts the individual pieces 12 in the blanket 10 as being the same shape, e.g., square, other geometric shapes may be cut. The geometric shapes can be configured in the cutting process to optimize compressive recovery results. The pieces may be a variety of shapes, i.e., triangular, square, etc. or may be the same shape. The geometric shapes can be configured in the cutting process to optimize compressive recovery results. It is not critical that the pieces that make up the blanket have the same shape or be composed of the same fibrous material so long as the pieces can be bonded together. In certain instances, it may be desirable to alter the geometry of the pieces or fiber content to "tune" the desired physical properties. The size of the individual pieces 12 may vary according to the use of the blanket. Typical sizes of the individual pieces range from about 0.5 to about 1.25 square inches.

Figure 2:
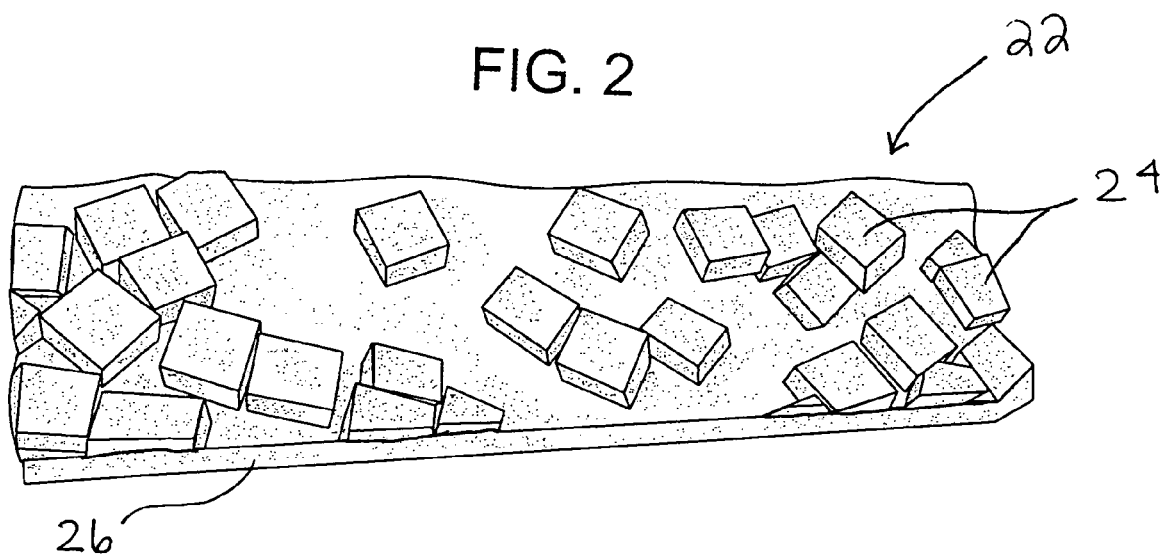
FIG. 2 is a perspective view of another embodiment of the present invention.
Figure 3:
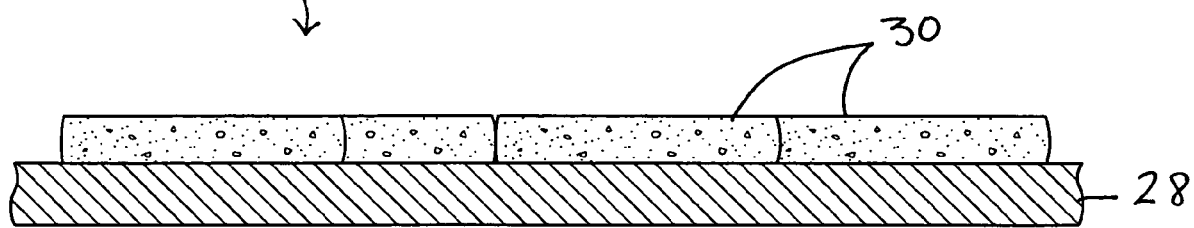
FIG. 3 is an end elevational view of the embodiment of the present invention as depicted in FIG. 2.

FIG. 2 illustrates a second embodiment of the present invention. Blanket 22 is depicted as having individual pieces of polymer fiber blanket 24 bonded to a uniform polymer blanket 26. FIG. 3 is an end elevational view of the product 22 as disclosed in FIG. 2 showing the individual pieces 30 bonded to the uniform polymer blanket 28.

Both the individual pieces 24 and the uniform polymer blanket 26 are described above in detail. The blanket 22 is made by applying individual pieces of polymer fiber blanket 24 on top of a uniform polymer blanket 26. Both the individual pieces 24 and the uniform polymer blanket 26 are then bonded by heat and pressure.

The use of the uniform polymer blanket 26 in combination with the individual pieces 24 provides greater strength to the product. There are several advantages to using the uniform blanket in combination with individual pieces, i.e., the uniform blanket provides a smooth surface for bonding i.e., bonding to an automotive floor surface. Further, by adding or omitting individual pieces, the properties of the product may be changes, i.e., creating a softer or stiffer product. The acoustics may also be tuned by adding or omitting pieces on the uniform blanket.

In applications requiring superior heat insulative characteristics, a facing layer 21 or 23, as shown in FIG. 5, may be formed from a heat reflective material such as a metallic foil (e.g. aluminum or other heat reflective metal). The facing layer may be applied the uniform polymer blanket 16 (FIG. 5) and/or the individual pieces 12 (FIG. 1) may be cut from and uniform polymer blanket having a facing layer 21 or 23. Where a metallic foil is used foil thickness is generally in the range of 0.025–0.25 mm. The thickness selected is based upon the temperature, durability and structural requirements of the particular product application.

The facing layer 21 or 23 may be reinforced or non-reinforced. Reinforcements are included to add durability and structural integrity. Reinforcements may take the form of fibrous scrims, fibrous mats or fibrous webs. For many applications, the reinforcement is made from a relatively strong fiber such as fiberglass. The strands may be materials other than glass which provide the desired properties (e.g. polyester).

Alternative reinforcement materials for the facing layer 21, 23 include but are not limited to glass mats, polymer mats and blended mats. The reinforcement may be pre-attached to the metallic foil. Alternatively loose laid reinforcement may be utilized. In most applications, the foil layer reinforcement provides improved tear resistance, strength and/or acoustical insulating properties. However, in many applications, it should be appreciated that no reinforcement is necessary.

The facing layer 21 or 23 (reinforced or non-reinforced) is attached to the polymer based pad 18 by means of a heat activated adhesive. The adhesive utilized may be a thermoplastic sheet or thermoplastic web material that tends to melt and flow at temperatures between 200–350° F. Adhesives of this type are desirable because they can be activated during the molding phase of production. Besides thermoplastic sheets and webs, adhesives such as hot melts, latex and various heat-activated resins may be utilized. The adhesive may be a separate layer as illustrated or the adhesive may already be attached to the facing layer 21 or 23.

Other embodiments of the present invention (not shown) may be utilized. For example, the embodiment as disclosed in FIG. 2, may have a double layer of uniform polymer blanket 26. In another alternative, the polymer blanket 10 may comprise a double layer of individual pieces 12. A water barrier may also be incorporated such as that disclosed in co-pending U.S. application Ser. No. 10/160,776; filed May 31, 2002 wherein is herein incorporated by reference.

The foregoing description of preferred embodiments of the invention has been presented for purposes of illustration and description. It is not intended to be exhaustive or to limit the invention to the precise form disclosed. Obvious modifications or variations are possible in light of the above teachings.

The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A compressible, flexible, polymer fiber blanket comprising a plurality of individual polymeric fibrous pieces bonded together by heat and compression to form a single, uniform layer of bonded polymeric fibrous pieces, said uniform layer having a density from about 8.0 to 80.0 kg/m$^3$.

2. The compressible, flexible, polymer fiber blanket of claim 1, wherein said compressible, flexible, polymer fiber blanket comprises staple fibers and bicomponent fibers.

3. The compressible, flexible, polymer fiber blanket of claim 2, wherein said staple fibers comprise glass fibers and said bicomponent fibers comprise thermoplastic fibers.

4. The compressible, flexible, polymer fiber blanket of claim 1, wherein said polymeric fibrous pieces are made of scrap material.

5. The compressible, flexible, polymer fiber blanket of claim 1, wherein said polymeric fibrous pieces are randomly oriented.

6. The compressible, flexible, polymer fiber blanket of claim 1, wherein said polymeric fibrous pieces are arranged in a controlled pattern.

7. The compressible, flexible, polymer fiber blanket of claim 1, wherein said polymeric fibrous pieces are geometric in shape.

8. The compressible, flexible, polymer fiber blanket of claim 1, wherein said polymer fiber blanket has a percent wet compression between about 15 to about 18 percent.

9. The compressible, flexible, polymer fiber blanket of claim 1, wherein said polymer fiber blanket has a percent dry compression between about 16 to about 21 percent.

10. The compressible, flexible, polymer fiber blanket of claim 1, wherein said polymer fiber blanket has a percent dry wet recovery between about 85 to about 87.5 percent.

11. The compressible, flexible, polymer fiber blanket of claim 10, further comprising a secondary layer comprising a plurality of polymeric fibrous pieces bonded together in a pattern, wherein said secondary layer of polymeric fibrous pieces is produced from a thermally bonded polymer blanket product.

12. The compressible, flexible, polymer fiber blanket of claim 10, wherein said uniform layer of said polymeric fibrous pieces has a first skin along a first face thereof, said first skin having a thickness between about 0.25–10.0 mm and a density between about $32.0–800.0$ kg/m$^3$, said polymeric fibrous pieces including fibers selected from (a) thermoplastic polymer staple fibers and thermoplastic bicomponent fibers, (b) glass staple fibers and thermoplastic bicomponent fibers and (c) a combination of (a) and (b).

13. The compressible, flexible, polymer fiber blanket of claim 12, wherein said uniform layer of polymeric fibrous pieces includes a second skin along a second face thereof.

14. The compressible, flexible, polymer fiber blanket of claim 1, wherein said polymer blanket is thermally bonded to at least one uniform layer of flexible polymeric fibrous material.

15. The compressible, flexible polymer fiber blanket of claim 14, wherein said fibrous materials are formed from fibrous materials from polyester, polyethylene, polypropylene, nylon, glass fibers, natural fibers and any mixtures thereof.

16. The compressible, flexible, polymer fiber blanket of claim 1, wherein said uniform layer of polymeric fibrous pieces further comprises at least one facing layer.

17. The compressible, flexible, polymer fiber blanket of claim 16, wherein said facing layer is a material selected from metallic foil, glass mats, polymer mats and blends thereof.

18. The compressible, flexible, polymer fiber blanket of claim 1, wherein said uniform layer of polymeric fibrous pieces further comprises at least one water barrier layer.

19. A compressible, flexible, polymer fiber blanket comprising a plurality of polymeric fibrous pieces thermally bonded together, wherein said plurality of polymeric fibrous pieces are produced from a thermally bonded, uniform layer of flexible, polymeric material, wherein said polymeric fibrous pieces comprise a lofty, acoustically insulating portion having a density between substantially $8.0–80.0$ kg/m$^3$ and a relatively higher density skin along at least one face thereof, said skin having a thickness between substantially 0.25–10.0 mm and a density between substantially $32.0–800.0$ kg/m$^3$.

20. The compressible, flexible, polymer fiber blanket of claim 1, wherein said blanket is an automotive undercarpet.

21. The compressible, flexible, polymer fiber blanket of claim 1, wherein said polymer fiber blanket is a nonlaminate.

22. A compressible, flexible, polymer fiber blanket comprising a plurality of polymeric fibrous pieces thermally bonded together, wherein said polymeric fibrous pieces comprise a fibrous material having a lofty, acoustically insulating portion having a density between substantially $8.0–80.0$ kg/m$^3$ and a relatively higher density skin along a first face thereof said skin having a thickness between substantially 0.25–10.0 mm and a density between substantially $32.0–800.0$ kg/m$^3$, said fibrous material being selected from a group consisting of (a) thermoplastic polymer staple fibers and thermoplastic bicomponent fibers, (b) glass staple fibers and thermoplastic bicomponent fibers and (c) a combination of (a) and (b).

23. A multilayer, acoustical, thermal insulator comprising a plurality of polymeric fibrous pieces thermally bonded together, wherein said polymeric fibrous pieces comprise a lofty, acoustically insulating portion having a density between about $8.0–80.0$ kg/m$^3$.

24. The multilayer, acoustical, thermal insulator of claim 23, wherein said multilayer, acoustical, thermal insulator comprises staple fibers and bicomponent fibers.

25. The multilayer, acoustical, thermal insulator of claim 24, wherein said staple fibers comprise glass fibers and said bicomponent fibers comprise thermoplastic fibers.

26. The multilayer, acoustical, thermal insulator of claim 23, wherein said polymeric fibrous pieces are randomly oriented.

27. The multilayer, acoustical, thermal insulator of claim 23, wherein said polymeric fibrous pieces are arranged in a controlled pattern.

28. The multilayer, acoustical, thermal insulator of claim 23, wherein said polymeric fibrous pieces are geometric in shape.

29. The multilayer, acoustical, thermal insulator of claim 23, wherein said polymeric fibrous pieces further comprise a relatively higher density skin along at least one face thereof.

30. The multilayer, acoustical, thermal insulator of claim 29, wherein the density of said skin is between about 32.0 and about 800.0 kg/m$^3$.

* * * * *